United States Patent

Phillips et al.

[11] Patent Number: 6,074,019
[45] Date of Patent: Jun. 13, 2000

[54] VEHICLE HYDRAULIC BRAKING SYSTEMS OF THE BRAKE-BY-WIRE TYPE

[75] Inventors: Mark Ian Phillips, Birmingham; Alan Leslie Harris, Coventry; Mark Leighton Howell, Warwickshire; Peter Martin, Birmingham, all of United Kingdom; Karl Friedrich Wörsdörfer, Budenheim, Germany

[73] Assignee: Lucas Industries public limited company, United Kingdom

[21] Appl. No.: 09/174,044

[22] Filed: Oct. 16, 1998

Related U.S. Application Data

[63] Continuation of application No. PCT/GB97/01048, Apr. 16, 1997.

[30] Foreign Application Priority Data

Apr. 17, 1996 [GB] United Kingdom .................... 9607939
Apr. 17, 1996 [GB] United Kingdom .................... 9607940

[51] Int. Cl.⁷ .................................................... B60T 8/36
[52] U.S. Cl. .................................. 303/119.1; 303/116.1; 303/113.5
[58] Field of Search ............................. 303/119.1, 113.5, 303/9.62, 10, 11, 15, 9.75, 169, DIG. 1, DIG. 2, 116.1, 119.2

[56] References Cited

U.S. PATENT DOCUMENTS

| 4,743,076 | 5/1988 | Davis et al. ......................... 303/119.1 |
| 4,861,115 | 8/1989 | Petersen .................................... 303/15 |
| 5,004,300 | 4/1991 | Brearley et al. ......................... 303/15 |
| 5,021,957 | 6/1991 | Yoshino et al. ....................... 303/9.62 |
| 5,294,190 | 3/1994 | Feldman et al. ............................. 303/3 |
| 5,302,008 | 4/1994 | Miyake et al. ............................ 303/15 |
| 5,632,532 | 5/1997 | Ohoka et al. ........................ 303/116.1 |

FOREIGN PATENT DOCUMENTS

| 0447 750 A1 | 9/1991 | European Pat. Off. . |
| 34 23 944 A1 | 1/1986 | Germany . |
| 35 01 179 A1 | 7/1986 | Germany . |
| 40 03 122 A1 | 8/1991 | Germany . |
| 40 30 980 A1 | 4/1992 | Germany . |

*Primary Examiner*—Christopher P. Schwartz
*Assistant Examiner*—Mariano Sy
*Attorney, Agent, or Firm*—MacMillan, Sobanski & Todd, LLC

[57] ABSTRACT

A vehicle hydraulic braking system of the brake-by-wire type is disclosed in which proportional solenoid-operated valves (12, 13) are adapted to control the pressure in wheel brake actuators of the brakes (8, 9) on a single axle of a vehicle, and a balance valve (20) is provided to enable individual hydraulic brake circuits to be hydraulically connected so that the pressure applied to each brake is guaranteed to be substantially the same, a first one (13) of the proportional valves (12, 13) is adapted to be isolated so that the hydraulic circuit is fed by a second, single, proportional valve (12). Applying both brakes under the control of a single proportional valve ensures that any fluid leakages are balanced since substantially equal brake-applying pressures are generated. An alternative vehicle hydraulic braking system of the brake-by-wire type is also disclosed in which a control module (3) is provided which is adapted to select between at least a first control mode (104) in which more than one of the proportional valves (12, 13) is adapted to be controlled in parallel and a second control mode (103) in which only one of the proportional valves (12, 13) is operated to control the pressure in the wheel brake actuators.

13 Claims, 4 Drawing Sheets

VEHICLE HYDRAULIC BRAKING SYSTEMS OF THE BRAKE-BY-WIRE TYPE

This application is a continuation of copending application International Application No. PCT/GB97/01048 filed on Apr. 16, 1997, and which designated the U.S.

This invention relates to hydraulic braking systems of the brake-by-wire type in which operation of a brake-pedal actuates a demand sensing device, such as a potentiometer or the like, of which the output, in turn, is adapted to regulate a supply of hydraulic fluid to the brake through solenoid-operated actuator valves, and under the control of an electronic control device.

Each solenoid-operated actuator valve comprises a proportional solenoid valve of the kind in which, by varying the current supply to the coil of the valve, fluid flow through the valve can be varied such that the pressure generated in a closed hydraulic circuit connected to the output port of the valve can be caused to rise at a variable rate, remain constant in a hold position, or fall at a variable rate.

In systems of the kind set forth in which the proportional solenoid valve is adapted to control the pressure in a wheel brake actuator, and a balance valve is provided to enable individual hydraulic brake circuits, for example on a single axle of a vehicle, to be hydraulically connected so that the pressure applied to each brake is guaranteed to be substantially the same, it is difficult to balance fluid leakage in proportional solenoid valves feeding a single hydraulic circuit.

This problem can be overcome by isolating one proportional valve from the hydraulic circuit and using the other proportional valve to feed fluid to the hydraulic circuit.

According to a first aspect of our invention in a vehicle hydraulic braking system of the brake-by-wire type in which proportional solenoid-operated valves are adapted to control the pressure in wheel brake actuators of the brakes on a single axle of a vehicle, and a balance valve is provided to enable individual hydraulic brake circuits to be hydraulically connected so that the pressure applied to each brake is guaranteed to be substantially the same, characterised in that a first one of the proportional valves is adapted to be isolated so that the hydraulic circuit is fed by a second, single, proportional valve.

Applying both brakes under the control of a single proportional valve ensures that any fluid leakages are balanced since substantially equal brake-applying pressures are generated.

Preferably, an isolator valve is provided at the output of the said first one of the proportional valves so as to enable said proportional valve to be isolated. The said first proportional valve may be reconnected through the isolator valve to the brake actuator(s) by opening the isolator valve. This may be advantageous when, for example, it is desired to generate individual brake pressures at each brake.

Alternatively, said first proportional valve can be placed in the hold condition, thus isolating the first proportional valve from the hydraulic circuit and preventing that valve from supplying fluid under pressure to the hydraulic circuit and allowing total control of the axle brake actuators from the other proportional valve. Exiting the hold condition automatically reconnects the valve to the hydraulic circuit.

Simultaneously to connecting the first, isolated, valve to the brakes, the balance valve may be closed to hydraulically isolate the individual hydraulic circuits thus allowing independent brake pressures to be generated.

Most preferably, said isolator valve and said balance valve may comprise a single three port two way valve (3/2) operable between a first position in which said first proportional valve is isolated from the brakes whilst the second proportional valve feeds both brakes, and a second position in which both the first and second proportional valves are connected to respective brake actuators whilst the common connection between the individual hydraulic brake circuits is closed thus allowing individual wheel brake pressures to be generated.

Alternatively, said balance valve may comprise a two port-two way (2/2) valve connected between the individual hydraulic circuits which works in combination with the hold position of the proportional valves.

According to a second aspect of our invention, in a vehicle hydraulic braking system of the brake-by-wire type in which proportional solenoid-operated valves are adapted to control the pressure in wheel brake actuators of the brakes on a single axle of a vehicle under control of a control means, and a balance valve is provided to enable individual hydraulic brake circuits to be hydraulically connected so that the pressure applied to each brake is guaranteed to be substantially the same, said control means is adapted to select between at least a first control mode in which more than one of the proportional valves is adapted to be controlled in parallel, and characterised in that said control mode is further adapted to select between said first control mode and a second control mode in which only one of said proportional valves is adapted to control the pressure in said wheel brake actuators.

Preferably, when said second control mode is selected, during a first braking operation a first one of said proportional valves is operated to control the brake pressure whilst the output of a second one of said proportional valves is isolated from the hydraulic circuit, and during a second subsequent braking operation, said second proportional valve is operated whilst the output of the first proportional valve is isolated from the hydraulic circuit. The choice of which valve controls the brake pressure thus "flip-flops" between the first and second valves on each operation in the second mode. This switching preferably occurs on alternate braking operations.

Preferably, the proportional valves are isolated from said hydraulic circuit by placing the proportional valve in the hold position. Alternatively, the proportional valve may be isolated from the hydraulic circuit using an isolating valve, such as a 3/2 position valve.

Preferably, said first control mode is selected at high braking duties or when a rapid dumping of pressure is required, and said second control mode is selected during low braking duties. This is advantageous as it ensures that the additional volume of the combined use of valves is available which allows higher duties to be achieved than if just one valve is operated.

Preferably, in the first control mode, both first and second proportional valves may be operated by the same current, preferably using a single control algorithm. This is advantageous as it prevents the valves from fighting against each other to control the pressure at the brakes.

In addition to the two main control modes of the second aspect of the invention described hereinbefore, the braking system may be adapted to select between one of three additional brake pressure demand modes. The first mode may correspond to zero brake pressure demand. The second mode may correspond to normal brake demand pressure in which the braking rates of both actuators on the axle is substantially the same. The third mode may correspond to the case where differing brake pressure demands are made by the brake actuators. In the second mode, the balance valve may be opened to guarantee a substantially matched pressure across the axle, thus achieving the balanced brake pressures. In the third mode, the balance valve may be closed to isolate the hydraulic circuits containing each brake actuator, and both actuators may then be controlled individually by applying a respective control signal to each respective proportional control valve.

A braking system in accordance with the first aspect, and a braking system in accordance with the second aspect of the present invention, are illustrated in the accompanying drawings in which.

Figure 1:
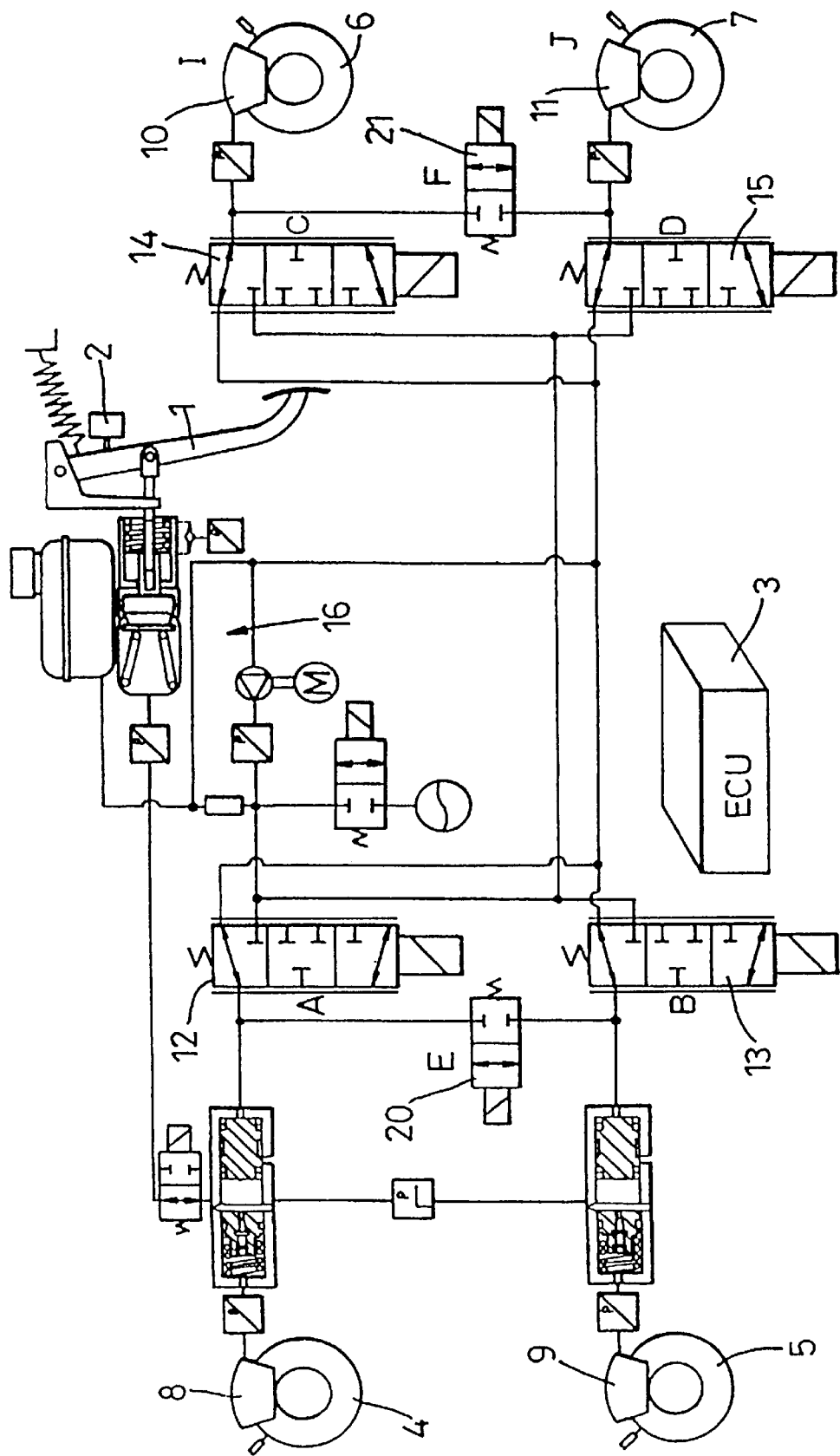
FIG. 1 is a layout of a braking system adapted to operate in accordance with the second aspect of the invention.

A brake-by-wire braking system in accordance with one aspect of the invention is shown in FIG. 1.

In the brake-by-wire type braking system illustrated in FIG. 1 of the drawings a brake pedal 1 is adapted to operate a travel transducer 2 in the form of a potentiometer of which the output is fed into an electronic control module 3 which also receives signals from transducers responsive to the vehicle dynamics, suspension deflections, and load transfer, in so far as these parameters affect the behaviour of a pair of front wheels 4 and 5, and a pair of rear wheels 6 and 7. Each wheel is adapted to be braked by a respective brake 8,9,10, and 11 from a fluid power system 16 under the control of the pedal.

Operation of each brake is controlled by a respective proportional solenoid-operated valve 12,13,14,15. The proportional valves 12 and 13 are arranged to control the pressure in the front wheel brakes in conjunction with a solenoid-operated balance valve 20, and the proportional valves 14 and 15, in conjunction with a solenoid-operated balance valve 21, are adapted to control the pressures applied to the brakes 10 and 11.

Whilst each balance valve 20 and 21 is in its closed position the valve 12 controls the pressure applied to the brake 8, and the valve 13 controls the pressure applied to the brake 9.

It is likely that valves 12 and 13 will exhibit different characteristics such that, under a range of unspecified conditions, the pressures in the actuators of the brakes 8 and 9 will be different, either in a steady state or whilst the pressures are changing during brake application. This may lead to vehicle instability. To overcome this problem, the balance valve 20 may be moved to its open position, hydraulically connecting the output ports of the valves 12 and 13. In this condition both valve 12 and valve 13 are capable of delivering fluid to control the pressures in the actuators of the brakes 8 and 9 simultaneously. To avoid the possibility of the aforementioned differing valve characteristics causing valves 12 and 13 to fight each other for control of the brake pressure, it is desirable to drive the valve 12 or the valve 13 such that it supplies no fluid to its output port and to deliver all the fluid for controlling the brake pressure from the output side of the other valve.

A similar mode of operation can be experienced for operating the brakes 10 and 11 on the rear axle by using the proportional valves 14 and 15 and the balance valve 21.

The proportional solenoid valves 12 and 13 are arranged to control the pressure in the actuators of the front wheel brakes 8 and 9 under the control of a control algorithm. The algorithm can operate in either a first or second control mode and selects between the two modes in response to braking demand or other variables.

In the first control mode, the balance valve 20 is open during normal braking operation. To avoid the possibility of the aforementioned differing valve characteristics causing the valves 12 and 13 under the control of independent control algorithms, fighting each other for control of the actuator pressures, the two valves 12, 13 are both supplied with the same current under the control of one control algorithm.

A further benefit obtained during the first control mode of operation of this arrangement is that any random variations in solenoid valve performance will cause one of the valves 12 and 13 to open fractionally earlier and close fractionally later than the other. This makes the delivery of fluid more progressive and thus makes the system more controllable. This benefit may further be extended by deliberately supplying one valve with slightly more current than the other in order to make the difference between the points at which each of the valves opens more predictable.

The proportional valves 14 and 15 are also controlled in a similar manner thereby obtaining the advantages detailed above with respect to solenoid valves 12 and 13.

In the second control mode, only one of the proportional valves 12, 13 is used to control the pressure in the actuators of the front wheel brakes 8, 9 whilst the output of the other actuator 12, 13 is controlled so that its output is held (i.e. in the held position as hereinbefore described). For ease of description, the valve 12, 13 which has its output held is referred to here as a 'slave' valve, whilst the other is referred to as a 'master'.

On alternate braking operations (i.e. each time the brake pedal is depressed indicating a new brake demand), the first solenoid valve 12, 13 is the 'master' whilst the second 12, 13 is the 'slave' and vice versa. Thus, on each braking operator, the role of the two valves is swapped over under the control of the control means.

Figure 3:
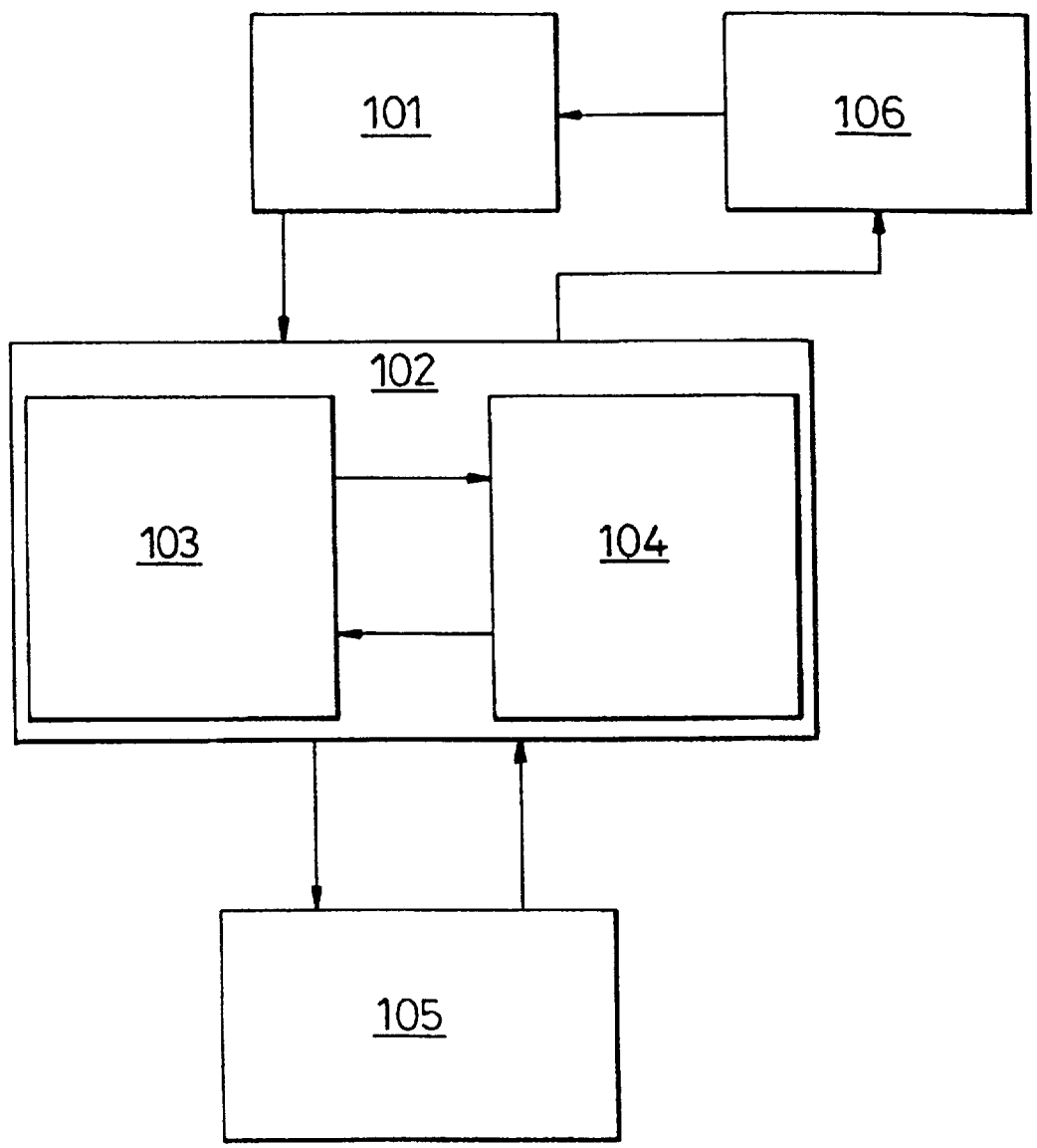
FIG. 3 shows a schematic for a control algorithm adapted in accordance with the second aspect of the invention.

To better understand the two control modes, reference is made to the control algorithm shown in the schematic of FIG. 3.

The first and second control modes are indicated in the schematic. The first control mode is labelled 104 in the figure and is selected primarily at high braking duties. The second control mode is labelled 103 in the figures and is selected primarily at low braking duties. During normal operation 102, the balance valve 20 between the axles is opened, so that regardless of which control mode 103, 104 is selected, brake pressure applied to each wheel brake is guaranteed to be substantially the same. In an alternate operational mode 105, when the pressure demand for each wheel brake is different the control mode 105 may be adapted to control each proportional valve separately as well as closing the valve 20 to allow independent pressures to be generated at each wheel brake. On exiting a brake operation to a zero braking condition 101, the control means alternates which of the proportional valves acts in the hold position i.e. as the slave valve for the next braking operation. This is represented by the block 106. All these modes are shown in FIG. 3.

Figure 4:
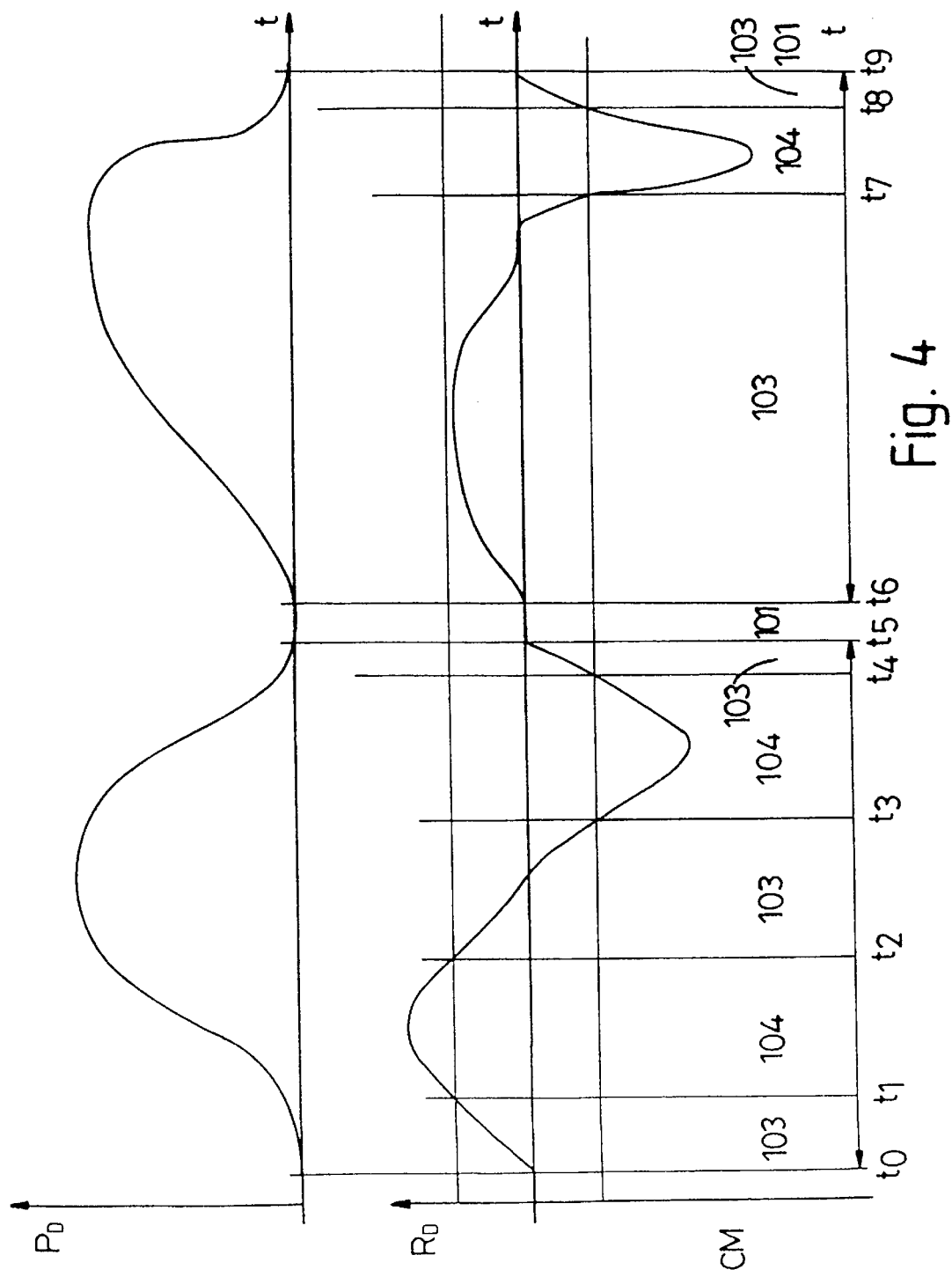
FIG. 4 is a plot of pressure demand, PD, demand rate, RD and control mode CM against time t on a common axis for a typical brake operation cycle.

FIG. 4 shows an example of a brake operation illustrating the various control modes selected for each brake condition. The figure shows a plot of brake pressure demand PD (assumed to be equal for each wheel brake), demand rate RD, and control mode selected against a common time axis for a typical brake demand pattern.

Initially, from zero brake demand 101 at time to, the driver applies the brake pedal to start a brake operation which spans from $t_0$ to $t_5$. Initially, brake demand is low and so the second control mode 103 is selected in which only a single proportional valve 12, 13 is used to increase brake pressure whilst the other valve is maintained in a pressure hold condition. In the example, it is assumed that the valve 12 is acting as the master and valve 13 is the slave. At time $t_1$, the pressure demand has increased to the threshold level for selecting the first control mode 104. Both proportional valves 12, 13 are thus controlled in parallel from time $t_1$ to $t_2$ to meet the high demand. From time $t_2$ to $t_3$ braking demand has decreased and so the second control mode 103 is again selected.

At time $t_3$, brake demand rate DR starts to decrease at a high rate, and so the first control mode 104 is reselected to meet the demand. Finally, from $t_4$ to $t_5$, when demand is again low, the second control mode 103 is selected. It will be noted that throughout this single brake operation, the same valve 12 always acts as the master whilst valve 13 acts as the slave during the second control mode, and the balance valve 20 is open to allow equal braking pressure.

From time $t_6$ to $t_9$, following a period of zero braking demand 101, a second braking operation is commenced as the brake pedal is depressed. This time, the role of the proportional valves 12, 13 is swapped over, and valve 13 acts as the master, whilst valve 12 acts as the slave. This swapping occurs on every subsequent braking operation to ensure approximately equal usage of both valves 12, 13 and prevent a valve seizing up due to constant use as a slave valve. It also ensures substantially even wear of the two valves. Selection of the first and second control modes 103, 104 is again made in response to a measure of brake demand rate RD as for the first operation, the second mode being selected from $t_6$ to $t_7$, the first mode from $t_7$ to $t_8$ and the second from $t_8$ to $t_9$.

Figure 2:
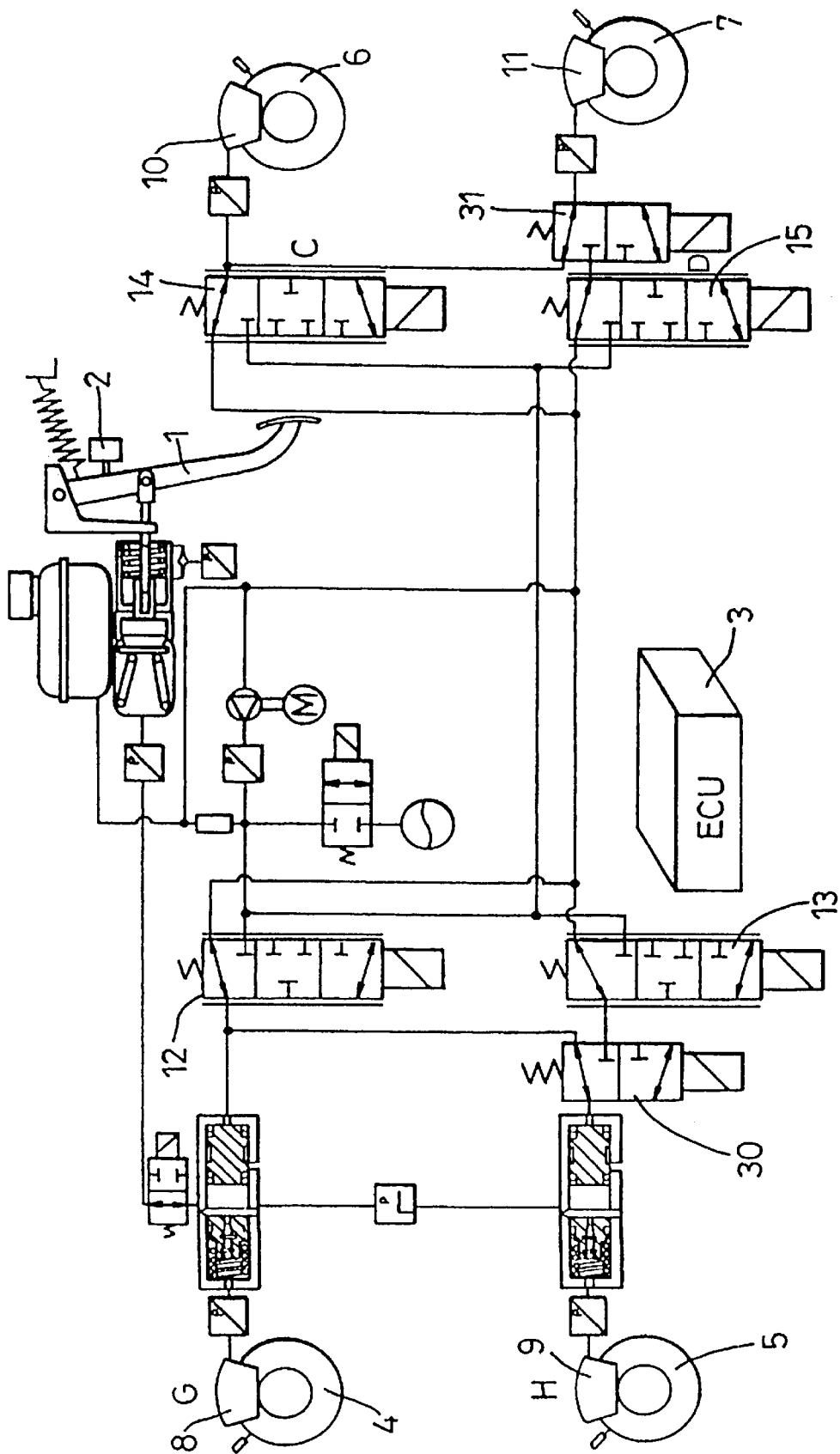
FIG. 2 is a layout of a braking system according to a first aspect of the present invention.

A braking system in accordance with at least the first aspect of the invention is illustrated in the layout of FIG. 2 of the drawings. The balance valves 20 and 21 in the layout of FIG. 1 are omitted, and the front wheel brake circuit incorporates a 3-port balance valve 30 and the rear wheel brake circuit incorporates a similar 3-port balance valve 31.

Each balance valve 30,31 is arranged in each respective circuit so that while the balance valve is in its open position, opposite from that shown in the drawing, the proportional valve 12 controls the pressure in the actuator of the front brake 8, and the proportional valve 13 controls the pressure in the actuator for the brake 9 on the other front wheel 5.

Since it is likely that the valves 12 and 13 will have different characteristics such that, under a range of unspecified conditions the pressures in the actuators of the brakes 8 and 9 will be different, either in a steady state or rather pressures are changing during brake application, this may lead to vehicle instability. To overcome this drawback, the balance valve 30 may be moved to its closed position, as shown, thereby hydraulically isolating the output port of the valve 13 from its associated brake actuator 9. Indeed the output port from the proportional valve 13 is blocked in this position. However with the balance valve 30 in the open position as shown, the output port from the proportional valve 12 is connected in the circuit such as to control the pressure in the actuators for both brakes 8 and 9.

In this condition only the valve 12 requires any control action, and the valve 13 can be left un-energised, thereby avoiding the need for a complicated control strategy to maintain it in its hold position.

A further advantage of this arrangement is a reduction of system operating current during all the normal, non APS/ CDC brake applications since the proportional valve B need not be energised.

The balance valve 31 can operate in a similar manner in conjunction with proportional valve 14 and 15.

We claim:

1. A vehicle hydraulic braking system of the brake-by-wire type comprising individual hydraulic brake circuits in turn comprising brakes on a single axle of a vehicle, brake actuators for operating said brakes, proportional solenoid-operated valves for controlling pressure in said brake actuators, and a valve to enable said individual hydraulic brake circuits to be hydraulically connected whereby pressure applied to said brakes is substantially the same, wherein flow through a first one of said proportional valves is adapted to be blocked so that said hydraulic brake circuits are fed by a second, single, proportional valve.

2. A vehicle hydraulic braking system according to claim 1 wherein an isolator valve is provided at the output of the said one end of the proportional valves so as to enable the said one proportional valve to be isolated.

3. A vehicle hydraulic braking system according to claim 1 wherein said valve to enable said individual hydraulic brake circuits to be hydraulically connected is adapted to simultaneously isolate said individual hydraulic circuits and connect the second proportional valve to said brakes, to enable independent brake pressures to be generated at each said wheel brake.

4. A vehicle hydraulic braking system according to claim 2 wherein said isolator valve and said valve to enable said individual hydraulic brake circuits to be hydraulically connected comprise a single three port valve operable between a first position in which said first proportional valve is isolated from said brakes whilst the second proportional valve feeds both said brakes, and a second position in which both said first and second proportional valves are connected to a respective one of said brake.

5. A vehicle hydraulic braking system according to claim 1 wherein one of said proportional valves is placed in a hold position in order to isolate said valve from said hydraulic circuit.

6. A vehicle hydraulic braking system of the brake-by-wire type in which at least first and second proportional solenoid-operated valves are adapted to control the pressure in wheel brake actuators of the brakes on a single axle of a vehicle under control of a control means, and a valve is provided to enable individual hydraulic brake circuits to be hydraulically connected so that the pressure applied to each brake is substantially the same, said control means being adapted to select at least a first control mode in which more than one of the proportional valves is adapted to be controlled in parallel, and wherein said control means is further adapted to select between said first control mode and a second control mode in which only one of said proportional valves is adapted to control the pressure applied to said wheel brakes.

7. A vehicle hydraulic braking system according to claim 6 wherein, in said first control mode, said first and second proportional solenoid-operated valves are operated using a single control algorithm.

8. A vehicle hydraulic braking system according to claim 6, adapted so that when said second control mode is selected, during a first braking operation a first one of said proportional valves is operated to control the brake pressure whilst a second one of said proportional valves is driven so that it is prevented from supplying fluid under pressure to the brakes, and during a second subsequent braking operation, said second proportional valve is operated to control the brake pressure whilst the first proportional valve is driven so that it is prevented from supplying fluid under pressure to said brakes.

9. A vehicle hydraulic braking system according to claim 8 wherein said first and said second proportional valves control the brake pressure on alternate braking operations.

10. A vehicle hydraulic braking system according to claim 8, wherein when one of said proportional valves is driven so that the valve is prevented from supplying fluid under pressure to said brakes, the valve is placed in the hold condition to isolate the valve from the brakes.

11. A vehicle hydraulic braking system according to claim 6, wherein said first control mode is selected at high braking duties or when a rapid dumping of pressure is required.

12. A vehicle hydraulic braking system according to claim 6, wherein said second control mode is selected during low braking duties.

13. A vehicle hydraulic braking system according to claim 6, wherein said control means is adapted to select a third control mode in which said valve provided to enable individual hydraulic brake circuits to be hydraulically connected is closed to isolate the individual hydraulic brake circuits and both said first and second proportional valves are controlled by respective control signals when brake pressure demand for each said brake actuator is different.

* * * * *